United States Patent Office 3,442,171
Patented May 6, 1969

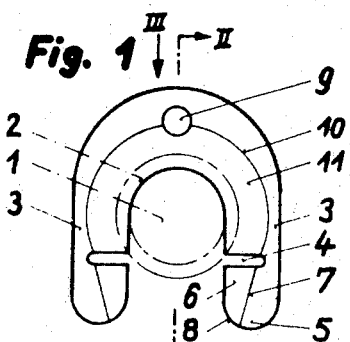
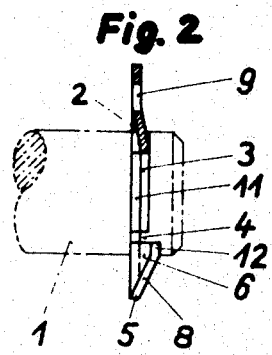
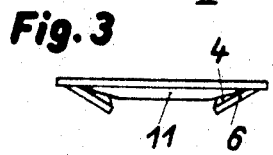
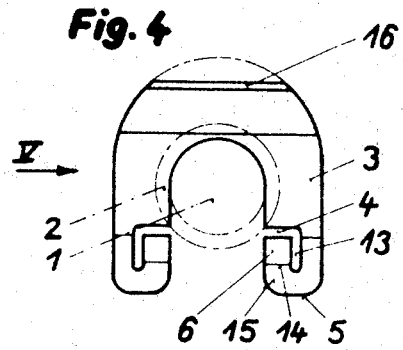
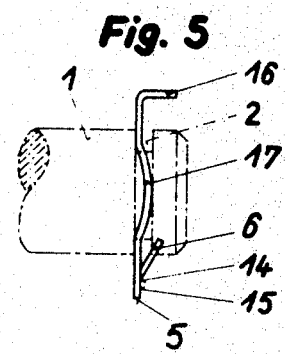
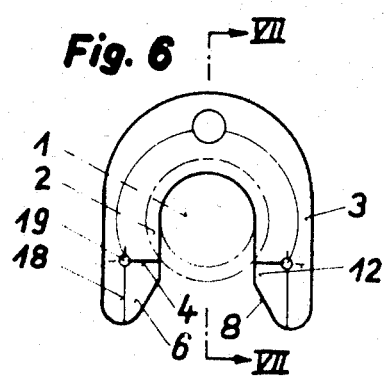
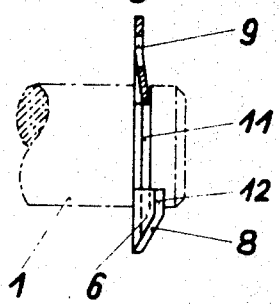

3,442,171
UNILATERALLY OPEN SAFETY CLIP
Walter Engelmann, Goppingen, Germany, assignor to
Fibora AG, Zurich, Switzerland
Filed May 4, 1966, Ser. No. 547,462
Claims priority, application Germany, May 7, 1965,
E 29,255; Sept. 10, 1965, E 30,076
Int. Cl. F16b 19/00, 21/00
U.S. Cl. 85—8.8
6 Claims

ABSTRACT OF THE DISCLOSURE

A safety clip, open at one end, and to be tightly clamped in an annular groove of a cylindrical member which comprises a relatively rigid part that extends over an angle of approximately 180° and is intended to engage in the annular groove, and arm portions provided at their ends with resilient retaining tongues for preventing the clip from unintentional removal from the cylindrical member. The retaining tongues may be separated from the arm portions by slots, notches or cut-outs.

---

The present invention relates to a unilaterally open safety clip, i.e., a safety clip open on one side, for tightly clamping the same in the annular groove of a cylindrical body or bore.

It is an essential feature of this invention that a relatively rigid portion of the safety clip extending over an angle of approximately 180° engages in the annular groove, whereas self-supporting arms of the clip carry at the ends thereof resilient retaining tongues preventing the clip from falling off.

Accordingly, it is an object of the invention to provide means by which a cylindrical body, such as a pin, pivot, or shaft can be firmly and securely engaged in every respect in an annular groove over the largest possible circumferential angle without having to resort to any special devices, steps or tools.

A further object of the invention resides in manufacturing such safety clips in an economical manner, such as by punching, in applying and removing the safety clips quickly and safely, as well as in enabling re-use thereof. By dividing the clip into a rigid portion and self-supporting arms with resilient retaining tongues, it is possible for the rigid portion to engage in the annular groove over an angle of about 180°. This permits an unobjectionable and completely satisfactory fit, and the safety clip is capable of absorbing a high axial load, with no risk of overstressing or breaking occurring therein.

In order that the present invention may be clearly understood and readily carried out in practice, a number of embodiments of the safety clip according to the present invention will now be more fully described with reference to the accompanying drawings, in which:

FIGURES 1 to 3 are, respectively, a plan view, a cross section along line II—II of FIGURE 1, and a side view in the direction of arrow III of FIGURE 1 of a first embodiment according to the present invention;

FIGURES 4 and 5 are, respectively, a plan view and a side view in the direction of arrow V of FIGURE 4 of a further embodiment in accordance with the present invention;

FIGURES 6 and 7 are, respectively, a plan view and a cross section along line VII—VII of FIGURE 6 of a third embodiment in accordance with the present invention;

Figure 8:
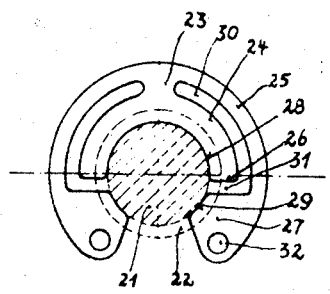
FIGURE 8 is a plan view of a safety clip having the form of an annulus inserted into the annular groove of a pin.

The safety clip according to FIGURES 1 to 3 is seated in the annular groove 2 of a pin 1. At the open side of the safety clip there are provided two arms 3, the free ends of which have each an inwardly open transverse slot 4.

A retaining tongue 6 deflected or bent in the axial direction along a line 7 extends in this embodiment from transverse slot 4 towards the leading end 5. Line 7 extends from the inner end of transverse slot 4 to the leading end 5 in a forwardly and inwardly inclined direction. A stop is formed by the edge of the deflected tongue 6, the edge pointing toward the transverse slot 4, which stop comes to rest against the surface of the pin adjacent to the annular groove 2, as seen in FIGURE 2. For easier insertion into the groove 2, the leading end 5 of the arm 3 is rounded off at its forward, free end portion. This permits an upwardly sloping, leading edge 8 on the retaining tongue 6, and it is this leading edge 8 which causes the depression of the tongue 6 as the clip is inserted into the groove. After the tongue 6 has been completely introduced and gets clear of the groove 2 at the opposite end thereof, it resumes its earlier position due to the elastic properties of the spring steel material from which the safety clip is made, and thus locks the clip in its inserted position.

The center portion of the safety clip has an aperture 9 which is adapted to receive a tool for withdrawing the clip. It is merely necessary for that purpose to depress the tongue 6 by means of pliers or a screwdriver until it enters the annular groove 2.

Along circular line 10 the safety clip has a plate- or dish-shaped embossment 11 extending through the inner end of the transverse slot 4; the tongue 6 is deflected in the extension of the embossment 11. The embossment 11 can thus be fixed together with the tongue 6.

As shown in FIGURE 2, the tongue 6 includes adjacent to the transverse slot 4 a short portion 12 extending substantially parallel to arm 3, the portion 12 linking up with the leading edge 8.

The embodiment according to FIGURES 4 and 5 differs from that just described with reference to FIGURES 1 to 3 mainly in that the transverse slot 4 within each arm 3 is connected with a longitudinal slot 13 and in that the tongue 6 is deflected along a line 14 extending transversely of the direction of insertion of the clip. A flat section 15 of arm 3 extends forwardly of line 14 towards the leading end 5, which section 15 makes it easier for the clip to be pressed home into the annular groove 2. The leading end 5 is rounded off. The upper side of tongue 6 forms an upwardly sloping leading area by means of which the tongue is by itself depressed as the clip is pressed home.

Instead of an aperture 9, a side bar 16 bent at a right angle at the center portion is used in the embodiment according to FIGURES 4 and 5 for withdrawing the clip. The arms 3 also include an embossment which, however, is not plate- or dish-shaped but is adapted to form an undulation 17. The result achieved by means of embossment 17 and 11, respectively, is that the safety clip can be seated in the annular groove without lateral clearance.

The embodiment illustrated in FIGURES 6 and 7 is similar to that of FIGURES 1 to 3. The tongue 6 is deflected along line 18 extending parallel to the arms 3. The transverse slot 4 is not formed by a cutout but only by a notch ending in a small aperture 19.

Tongue 6 includes adjacent to the transverse slot 4 a section 12 extending substantially parallely to arm 3. The leading edge 8 slopes downwardly from this section 12. Again, provision is made for a dish-shaped embossment 11 and an aperture 9 is provided for removing the clip.

Figure 9:
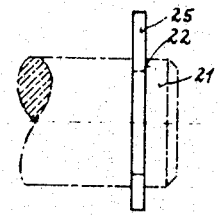
FIGURE 9 is a side view of the clip shown in FIGURE 8.

The safety clip shown in FIGURES 8 and 9 is made from a flat spring steel band and is formed in a plane by punching having substantially a ring-shaped configuration. The self-supporting arms are formed each by two inner legs 24 and two outer legs 25 which are connected to each other through a centrally disposed rigid portion 23 and are separated from each other by slots 30. The inner legs 24 and outer legs 25 originating from either side of portion 23 extend in a ring-shaped array parallel to each other, with the slots 30 changing over into inwardly directed transverse slots 31 which separate the ends of the legs from each other.

With their free ends 26, the inner legs 24 stretch to approximately the internal diameter of annular groove 22 of pin 21. The curved peripheral inner edges 28 of the inner legs 24 therefore engage approximately half of the cross-sectional area of pin 21 over an angle of over 180°, no elastic spring means being necessary for lateral insertion. However, a slight radial and resilient forcing apart can be readily effected if, for instance, the ends engage the pin over more than 180°. Consequently there is no need for accurately observing the range of 180°.

The outer legs 25, however, reach beyond the inner legs 24 and terminate in inwardly directed retaining tongues 27. The curved peripheral inner edges 29 of the latter engage in a radially resilient manner in the annular groove 22 at places located beyond the diameter of pin 21 and over an angle of more than 180°. As the clip is laterally placed into position, the retaining tongues 27 give way in an elastically resilient manner, snapping thereafter into the annular groove 22. The substantially radial and resilient yielding effect is promoted by the long outer legs 25 so that placing the clip into position in the annular groove 22 presents no difficulties and can be effected without tools. Also, the retaining tongues 27 may closely approach each other, i.e., even the second half of the cross-sectional area of pin 21 is securely engaged in the annular groove 22.

When the clip is to be removed from its position within the groove, it is only necessary to urge apart the retaining tongues 27 in an elastically yielding manner by means of a tool until the lateral edges 29 disengage from the annular groove 22 by a lateral expelling movement. Apertures 32 may be provided at the outer ends of the retaining tongues 27 to facilitate gripping by means of pliers or the like. Moreover, the inner legs 24 can readily be made so as to face each other, to assume a sloping position or to present a slightly corrugated shape so that the annular groove will be completely engaged or occupied and so that clearances are avoided. This is to ensure a tight, close fit in the axial direction of the pin.

Figure 10:
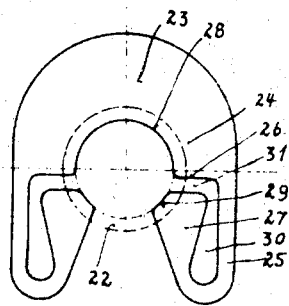
FIGURE 10 is a plan view of a modified embodiment of the clip shown in FIGURE 8.

While the safety clip in the embodiment of FIGURE 8, due to the curved configuration, has a diameter which is as small as possible and therefore occupies little space, the embodiment according to FIGURE 10 has slightly larger outer dimensions. The rigid portion 23 practically extends therein to half of the cross-sectional area of the pin to be held in position. This means that the inner legs 24, together with the peripheral inner edges 28 thereof, form a strong integral part with portion 23.

The outer legs 25 extend in a straight line and parallel to each other. They terminate in rearwardly extending retaining tongues 27 separated from the corresponding outer legs 25 by slots 30 and 31. The curved inner edges 29 of the retaining tongues 27 engage radially and in an elastically resilient manner in the annular groove 22 schematically indicated by a broken line. The mode of operation, as well as the application and removal are the same as with the clip of FIGURE 8. Due to the fact that the outer legs 25 project from the center of the safety clip, the slots 30 may also be used for gripping the clip in order to facilitate withdrawal thereof.

Figure 11:
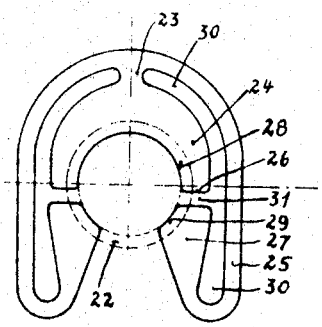
FIGURE 11 is a plan view of a further embodiment according to the present invention, similar to that of FIGURE 10.

The embodiment of FIGURE 11 is similar to that illustrated in FIGURE 10. The rigid portion 23, however, is as narrow as in the embodiment according to FIGURE 8, so that the inner legs 24 are the same as in the embodiment of FIGURE 8. The outer legs 25, however, with retaining tongues 27, correspond to those shown in FIGURE 10. This makes it possible to obtain especially long slots 30 originating from portion 23 and extending beyond transverse slots 31 to the reversal points between the outer legs 25 and the retaining tongues 27 thereof. In this manner, the radially resilient action will still be increased.

Figure 12:
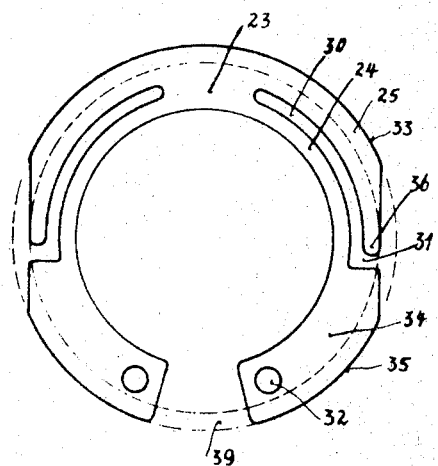
FIGURE 12 is a plan view of a safety clip suitable for engagement in the annular groove of a bore.
Figure 13:
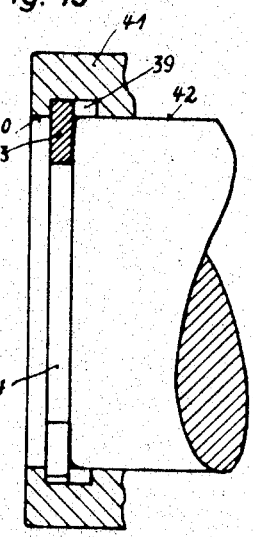
FIGURE 13 is an axial longitudinal, cross section of the clip shown in FIGURE 12.

In contrast with the foregoing embodiments, FIGURES 12 and 13 illustrate a safety clip which is positioned in the annular groove 39 of a bore 40 of a machine part 41 and which, for instance, holds a shaft 42 in position within the bore 40. Basically, a safety clip of this type has exactly the same structure features as the clip of FIGURE 8. It is designed in the form of a ring and has a rigid portion 23 from which originate inner legs 24 and outer legs 25 separated by slots 30 and transverse slots 31. Contrary to the embodiment of FIGURE 8, however, the outer legs 25 are provided with free ends 36, whereas the inner legs 24 project beyond the outer legs 25 and terminate in retaining tongues 34.

The outer peripheral edges 33 of the outer legs 25 engage in the annular groove 39. In addition, the free ends 36 of the outer legs 25 are segmentally chamfered at their outer edges so that their external diameter corresponds approximately to the internal diameter of annular groove 39. It is therefore possible to insert the outer leg 25 into the annular groove 39, with no special resilient effects resulting therefrom. In this manner, half of the circumference of annular groove 39 is engaged by the substantially radially rigid outer legs 25.

The retaining tongues 34 at the ends of inner legs 24 are substantially adapted to be pressed together radially inwardly and in an elastically resilient manner through the slots 30, so that the outer edges 35 of the retaining tongues may be reduced in size in such an elastically resilient manner as to fit the inside diameter of the bore 40. When the safety clip has been pressed home, the retaining tongues 34 reassume in an elastically resilient manner their previous shape and engage in the still free circumferential area of the annular groove 39. This ensures an unobjectionable tight fit of the safety clip in the annular groove 39. The ends of the outer edges 35 facing the ends 36 may be segmentally chamfered like the ends 36 to facilitate placing the clip into position.

Apertures 32 are provided at the outer ends for elastically pressing together the retaining tongues 34. By means of a tool, the inner legs can thus be readily pressed together, and there is no difficulty in positioning the safety clip as a whole into the bore 40, in inserting it into the annular groove 39 and in removing it therefrom.

Figure 14:
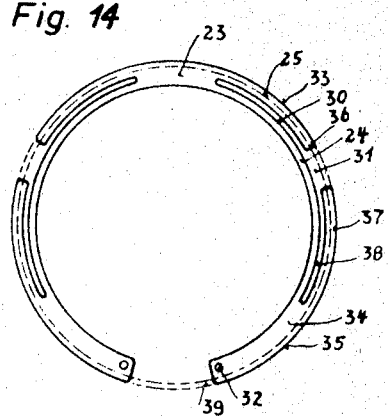
FIGURE 14 is a plan view of a modified embodiment of the clip shown in FIGURE 12.

FIGURE 14 shows a further embodiment similar to that of FIGURE 12. The safety clip illustrated therein is a flat, narrow, almost closed ring. The outer legs 25 and the inner legs 24 having retaining tongues 34 correspond to the embodiment of FIGURE 12. The retaining tongues 34, however, are provided with additional tongues 37 extending rearwardly in the form of a curve to the proximity of ends 36 of the outer legs 25. The slots 30 therefore lead from the rigid portion 23 to the transverse slots 31 from where they continue in the form of slots 38 reaching into the retaining tongues 34 and separate the extended inner legs 24 from the tongues 37 disposed concentrically thereto. The particular arrangement of the tongues 37 and of the slots 38 permits an especially efficient resiliency.

Moreover, it is also possible to omit the tongues 37 in the embodiment of FIGURE 14. This makes it easier to insert the clip into the annular groove 39, and there is provided a three-point system, based on the one hand on the outer legs 25 and on the other hand on the retaining tongues 34 of the radially resilient inner legs 24.

Finally, it should also be noted that in all of the embodiments described above the retaining tongues 27 and 34, respectively, may be provided with inner edges 29 and outer edges 35, respectively, the diameter of which will be smaller or greater than the respective diameters of the annular groove 22 or 39, respectively. This allows for a biased and resilient engagement of the retaining tongues in the groove 22 or 39, respectively, and results in an especially tight fit.

While I have shown and described several embodiments in accordance with the present invention, it is understood that the present invention is not limited thereto but is susceptible of numerous changes and modifications as known to a person skilled in the art.

I claim:

1. A retaining plate being open on one side thereof for insertion into an annular groove having an axis and the plate having groove bottom engaging edges along a closed curve that in the assembled position of the plate would generally correspond to the closed curve of the groove bottom, wherein the improvement comprises: a rigid inner portion having a curved edge extending along generally 180°, with respect to the axis, of the closed curve; a single outer rigid portion extending radially from substantially the center of said inner portion; elastic elongated spring arms on opposite sides of the plate, each being integral with said outer rigid portion and extending continuously toward the diametrically opposite side of said axis from the center of said outer rigid portion radially spaced a substantial distance from said closed curve; and locking tongues extending generally radially toward the closed curve from corresponding ones of said arms with edges extending along the closed curve diametrically opposite from portions of said curved edge.

2. The retaining plate according to claim 1, wherein each of the elastic arms is radially spaced from the closed curve by at least a slot cut out of the material of the retaining plate.

3. The retaining plate according to claim 2, wherein said slots are elongated to extend radially adjacent the corresponding tongues for a substantial angular extent.

4. The retaining plate according to claim 2, wherein said slots are elongated generally annularly and extend along at least a substantial portion of said 180° radially opposite from said curved edge.

5. The retaining plate according to claim 4, wherein said slots are elongated to extend radially adjacent the corresponding tongues for a substantial angular extent.

6. The retaining plate according to claim 4, wherein said slots extend along a major portion of said 180° radially opposite from said curved edge.

References Cited

UNITED STATES PATENTS

| | | | |
|---|---|---|---|
| 895,842 | 8/1908 | Chambers | 85—8.8 |
| 2,933,970 | 4/1960 | Pagano | 85—8.8 |
| 1,056,392 | 3/1913 | Barr et al. | 85—8.8 |
| 2,245,751 | 6/1941 | Blackmore | 85—8.8 |
| 2,284,222 | 5/1942 | Miller | 85—8.8 |
| 2,595,787 | 5/1952 | Heimann | 85—8.8 |
| 2,755,698 | 7/1956 | Wursel | 85—8.8 |
| 2,405,476 | 8/1946 | Weatherhead | 85—8.8 |

FOREIGN PATENTS

| | | |
|---|---|---|
| 287,753 | 3/1928 | Great Britain. |
| 400,397 | 10/1933 | Great Britain. |

EDWARD C. ALLEN, *Primary Examiner.*

U.S. Cl. X.R.

287—127